US012045387B2

(12) United States Patent
Zhang et al.

(10) Patent No.: US 12,045,387 B2
(45) Date of Patent: Jul. 23, 2024

(54) EYE TRACKING SYSTEM WITH IN-PLANE ILLUMINATION

(71) Applicant: Meta Platforms Technologies, LLC, Menlo Park, CA (US)

(72) Inventors: Qi Zhang, Kirkland, WA (US); Chad Lichtenhan, Vail, AZ (US); Morteza Karami, Renton, WA (US); Kuan Pei Yap, San Jose, CA (US); Mehmet Mutlu, Redmond, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 18/342,277

(22) Filed: Jun. 27, 2023

(65) Prior Publication Data

US 2024/0094809 A1 Mar. 21, 2024

Related U.S. Application Data

(60) Provisional application No. 63/407,587, filed on Sep. 16, 2022.

(51) Int. Cl.
*G06F 3/01* (2006.01)
*G06V 40/18* (2022.01)

(52) U.S. Cl.
CPC .............. *G06F 3/013* (2013.01); *G06V 40/18* (2022.01)

(58) Field of Classification Search
None
See application file for complete search history.

(56) References Cited

U.S. PATENT DOCUMENTS

| 9,465,991 | B2 | 10/2016 | Mei et al. | |
| 11,036,291 | B1 | 6/2021 | Zhang et al. | |
| 2013/0169683 | A1* | 7/2013 | Perez | G06F 21/32 |
| | | | | 382/117 |
| 2020/0124844 | A1* | 4/2020 | Ortiz Egea | G06F 3/013 |
| 2023/0194882 | A1* | 6/2023 | Yu | G03H 1/0248 |
| | | | | 359/13 |

FOREIGN PATENT DOCUMENTS

WO 2013067230 A1 5/2013

OTHER PUBLICATIONS

European Search Report for European Patent Application No. 23192907.6, dated Feb. 19, 2024, 7 pages.

* cited by examiner

*Primary Examiner* — Stephen T. Reed
(74) *Attorney, Agent, or Firm* — Mannava & Kang, P.C.

(57) ABSTRACT

An eye tracking system with in-optical-assembly plane illumination is described. Side-emitting light emitting diodes (LEDs) aligned with a plane of an optical assembly of a near-eye display device are used to illuminate the eye of a user and generate glints that can be detected by an eye tracking camera. When a corrective optical lens or similar element is included in the optical assembly that may distort illumination beams from the light emitting diodes (LEDs), the distortion is mitigated by using in-package or externally modified LEDs that provide angled beams. In addition to in-package level mitigations such as reflectors or labels, edge portions of the distorting optical elements may be shaped or complemented with refractive elements to redirect the beams toward the eye.

20 Claims, 16 Drawing Sheets

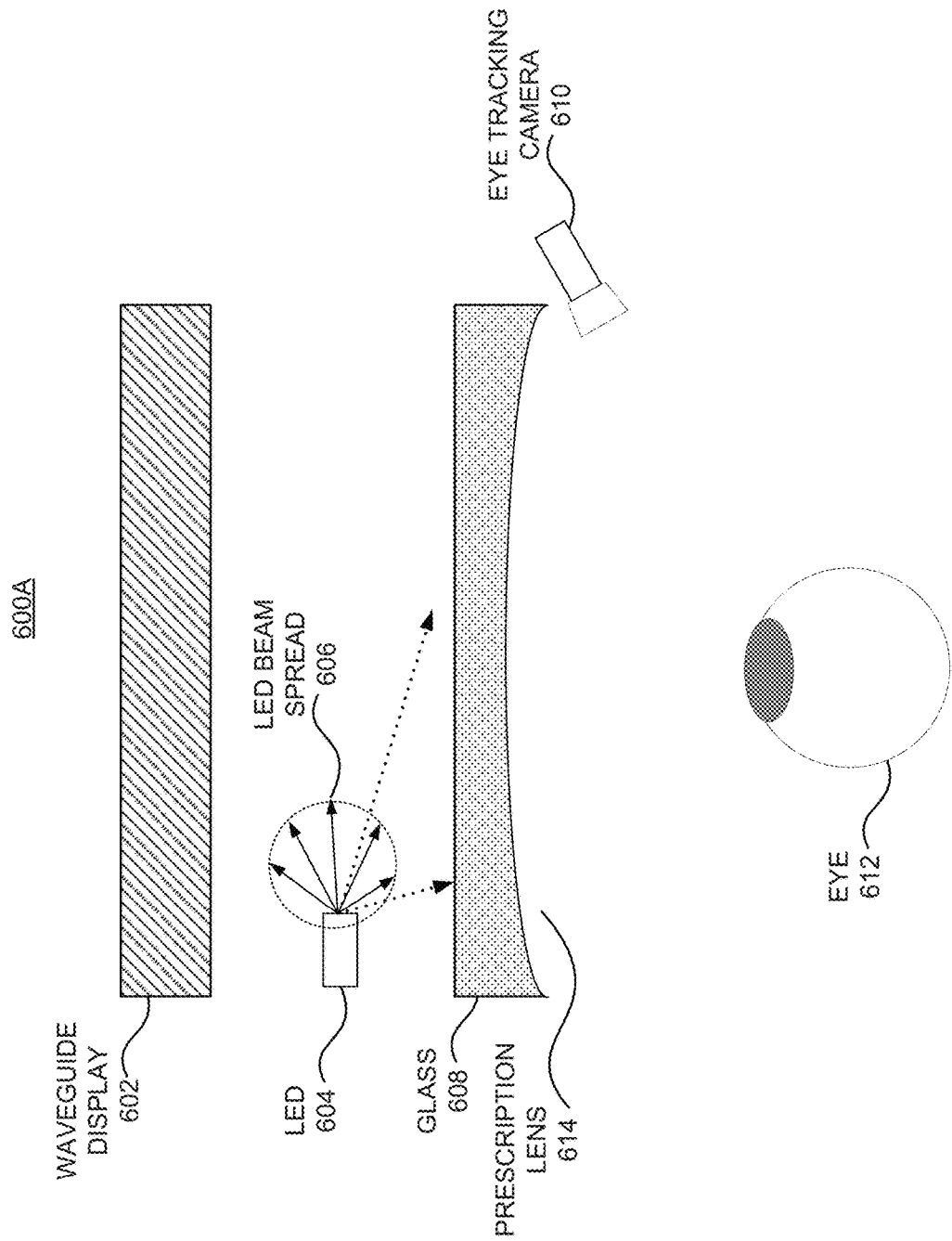

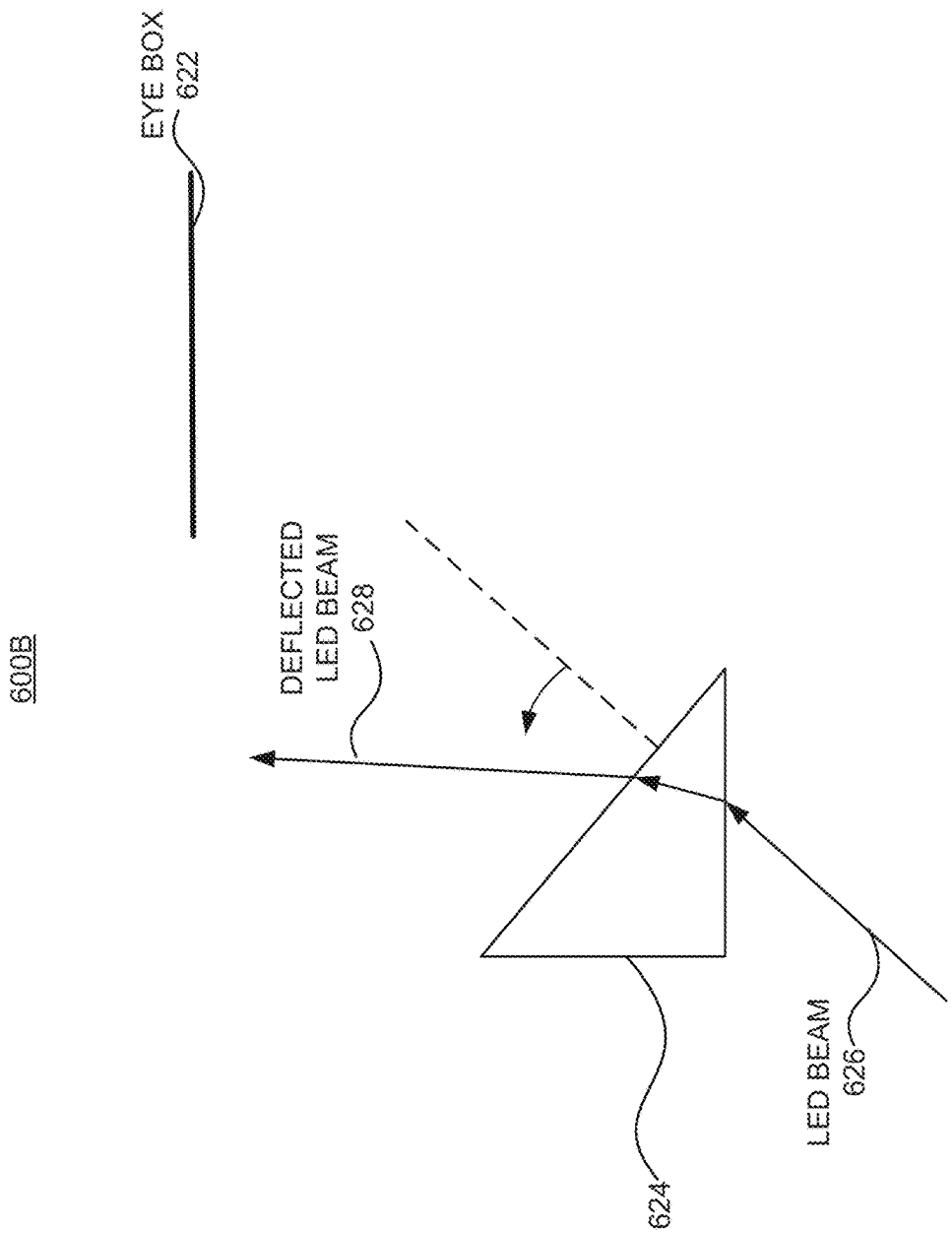

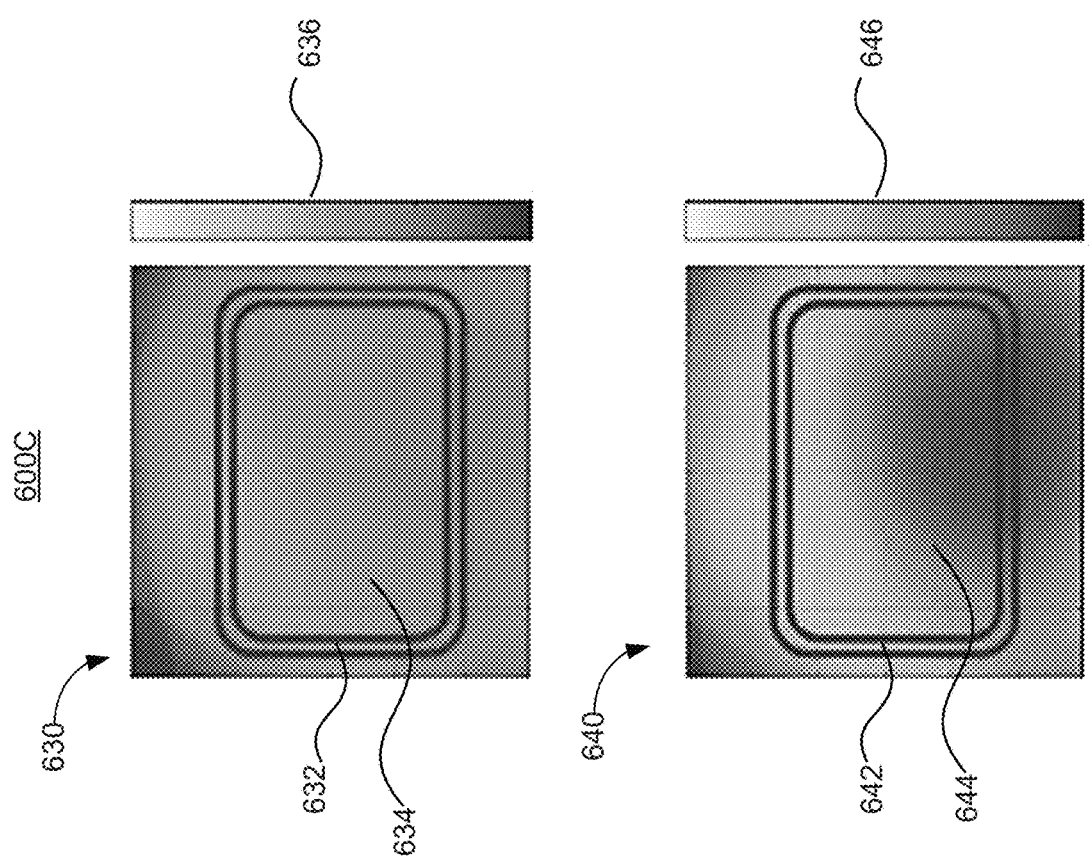

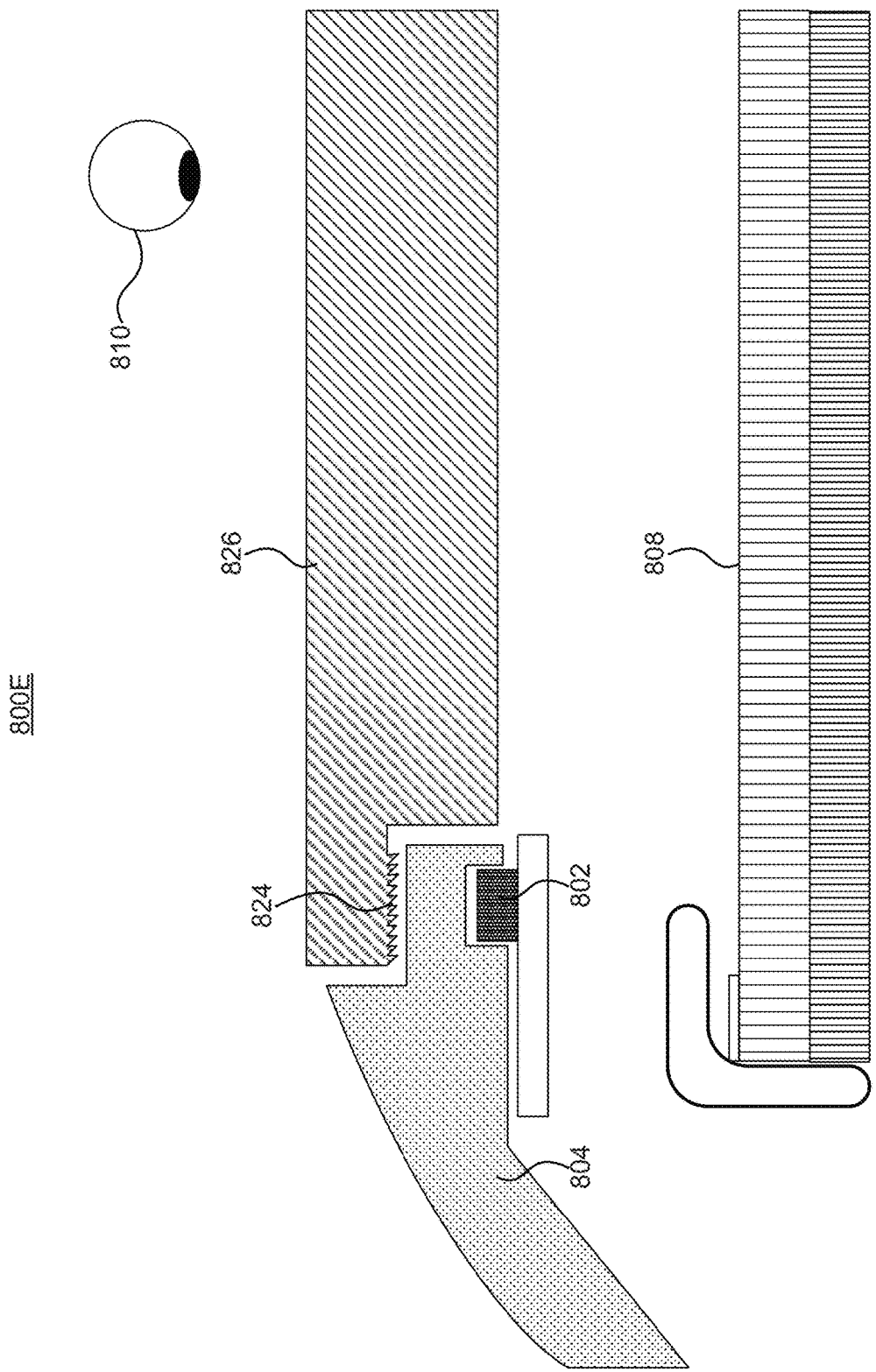

EYE TRACKING SYSTEM WITH IN-PLANE ILLUMINATION

PRIORITY

This patent application claims priority to U.S. Provisional Patent Application No. 63/407,587, entitled "Eye Tracking System with In-Plane Illumination," filed on Sep. 16, 2022.

TECHNICAL FIELD

This patent application relates generally to eye tracking in near-eye display devices, and in particular, to configuration of light emitting diodes (LEDs) projecting illumination in an optical assembly plane to achieve eye tracking functionality.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices may also present interactive content, where a user's (wearer's) gaze may be used as input for the interactive content.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 6A illustrates beam dissipation caused by a corrective lens in a lens perimeter illumination eye tracking system, according to an example.

FIG. 6B illustrates prism representation of the corrective lens in a lens perimeter illumination eye tracking system, according to an example.

FIG. 6C illustrates representative irradiance maps for a lens perimeter illumination eye tracking system showing loss of illumination due to the corrective lens, which may result in double glints, according to an example.

FIGS. 8A-8E illustrate various implementations of mitigating corrective optical lens distortions on light emitting diode (LED) beam in an eye tracking system, according to examples.

DETAILED DESCRIPTION

Figure 1:
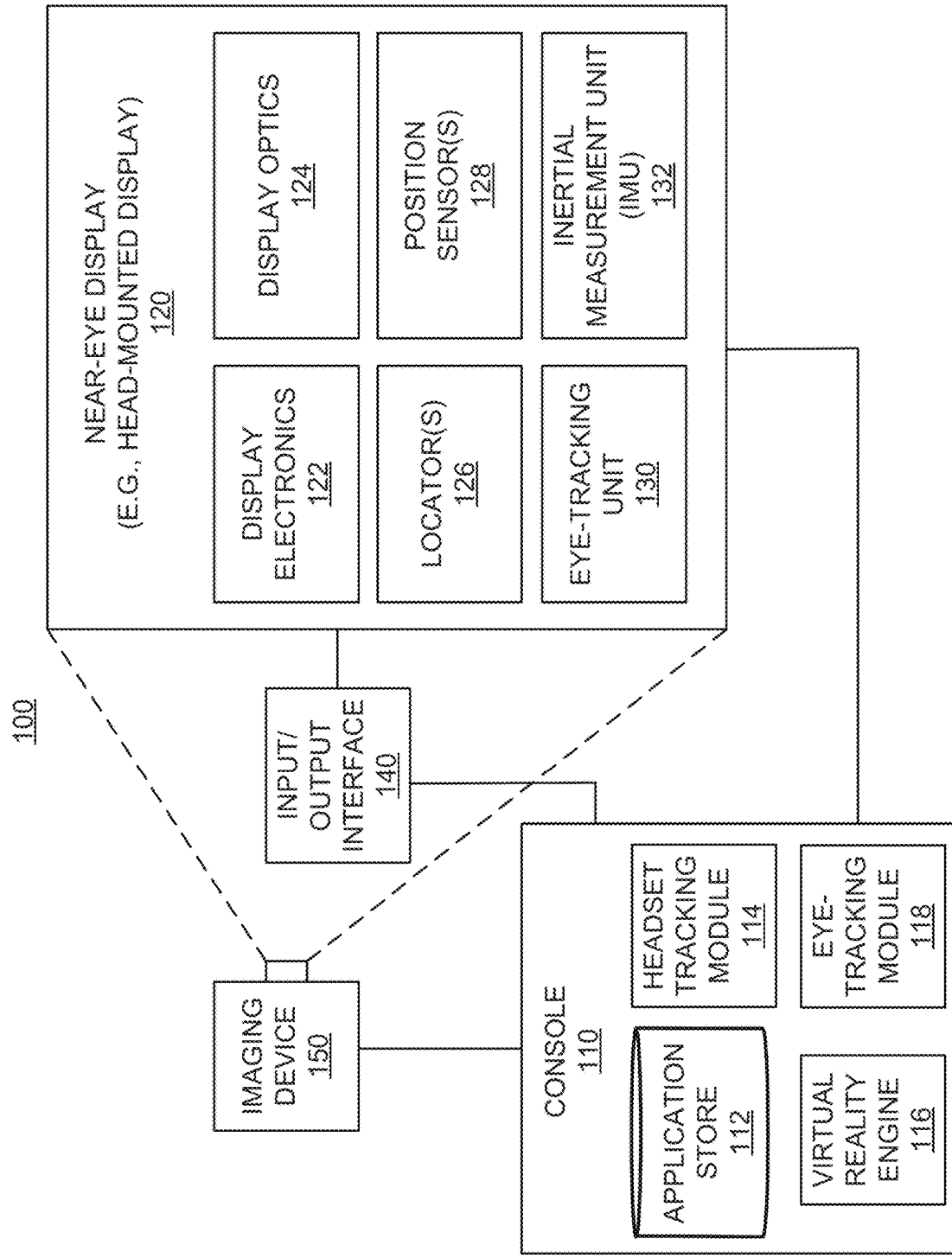
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Tracking a position and orientation of the eye as well as gaze direction in head-mounted display (HMD) devices may unlock display and rendering architectures that can substantially alleviate the power and computational requirements to render 3D environments. Furthermore, eye-tracking enabled gaze prediction and intent inference can enable intuitive and immersive user experiences adaptive to the user requirements in his/her interaction with the virtual environment.

Eye tracking may be achieved via a number of techniques. Fringe projection, which projects a periodical pattern onto the eye and uses the reflected pattern to determine 3D features, is one technique. Fringe patterns are periodical patterns. When a phase of the pattern is constrained to a particular interval, the phase of the fringe pattern is called a wrapped phase. Otherwise, the phase is called an unwrapped phase. Use of phase, instead of intensity, to build a correspondence relationship between projector and camera may allow accurate detection without complicated algorithms in the background.

In some examples of the present disclosure, an eye tracking system with in-optical-assembly plane illumination is described. Side-emitting light emitting diodes (LEDs) aligned with a plane of an optical assembly of a near-eye display device may be used to illuminate the eye of a user and generate glints that can be detected by an eye tracking camera. When a corrective optical lens or similar element is included in the optical assembly that may distort illumination beams from the light emitting diodes (LEDs), the distortion may be mitigated by using in-package or externally modified LEDs that provide angled beams (as opposed to aligned with the optical assembly plane). In addition to in-package level mitigations such as reflectors or labels, edge portions of the distorting optical elements (e.g., corrective optical lens) may be shaped or complemented with refractive elements to redirect the beams toward the eye.

While some advantages and benefits of the present disclosure are apparent, other advantages and benefits may include reduction of eye tracking system complexity and/or power consumption. Enhancement of eye tracking accuracy by increased illumination efficiency and accommodation of corrective optical lenses may be additional advantages.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze. In addition to using the fringe pattern reflection, the eye tracking unit 130 may also employ one or more illuminators to project light (e.g., infrared or near-infrared light) onto the eye and detect glints, which may be used in detecting eye surface and determining gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
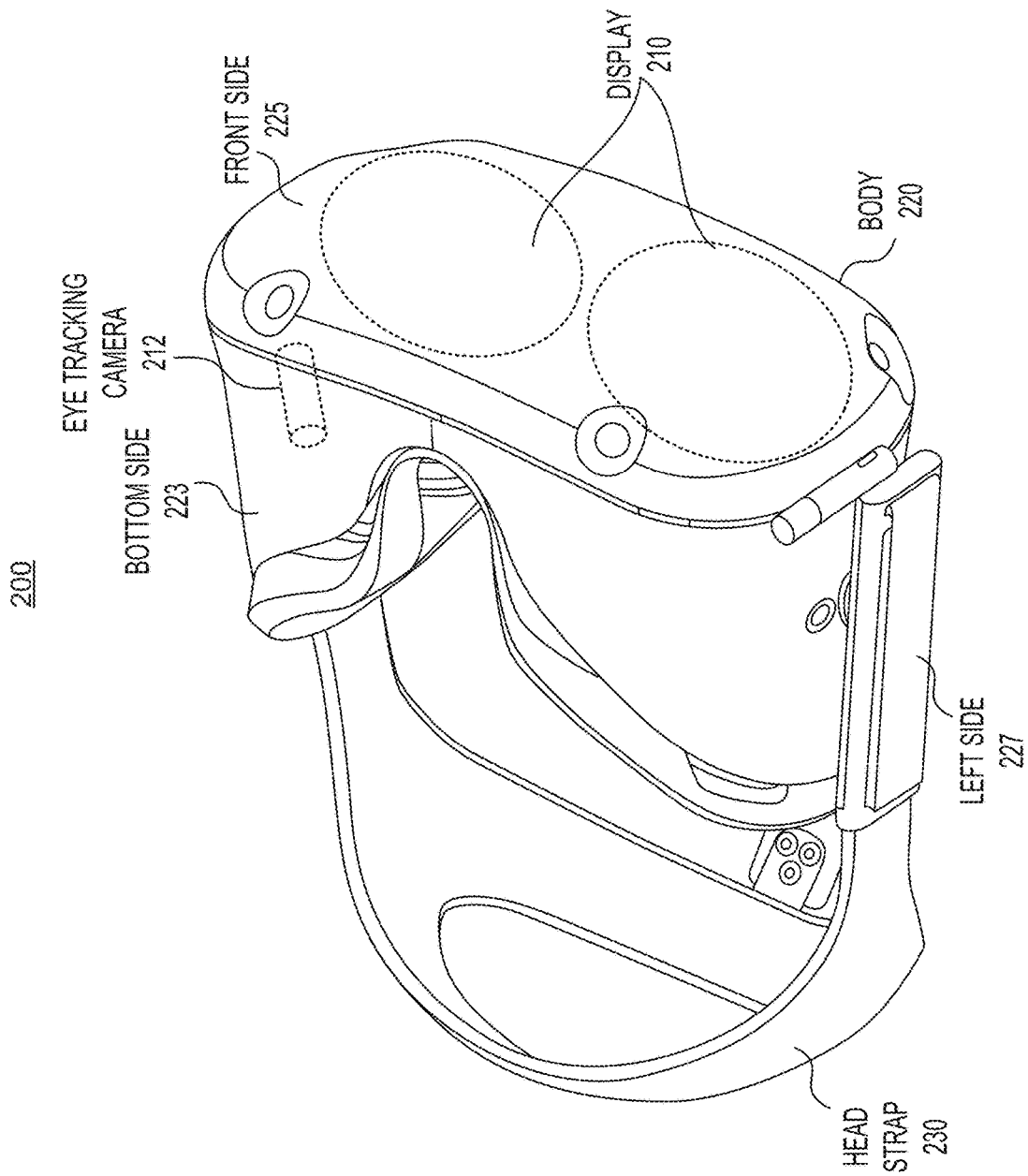
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the head-mounted device (HMD) device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface 140 for communicating with a console 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the virtual locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, the projector may provide a structured light (fringe pattern) onto the eye which may be captured by the eye tracking camera 212. The eye tracking camera 212 or a communicatively coupled processor (e.g., eye tracking module 118 in FIG. 1) may analyze the captured reflection of the fringe pattern and analyze to generate a phase map of the fringe pattern, which may provide depth information for the eye and its structures. In cases, where phase unwrapping is used, glints reflected from the eye may be used as anchors to generate an absolute phase map, for example.

Figure 3A:
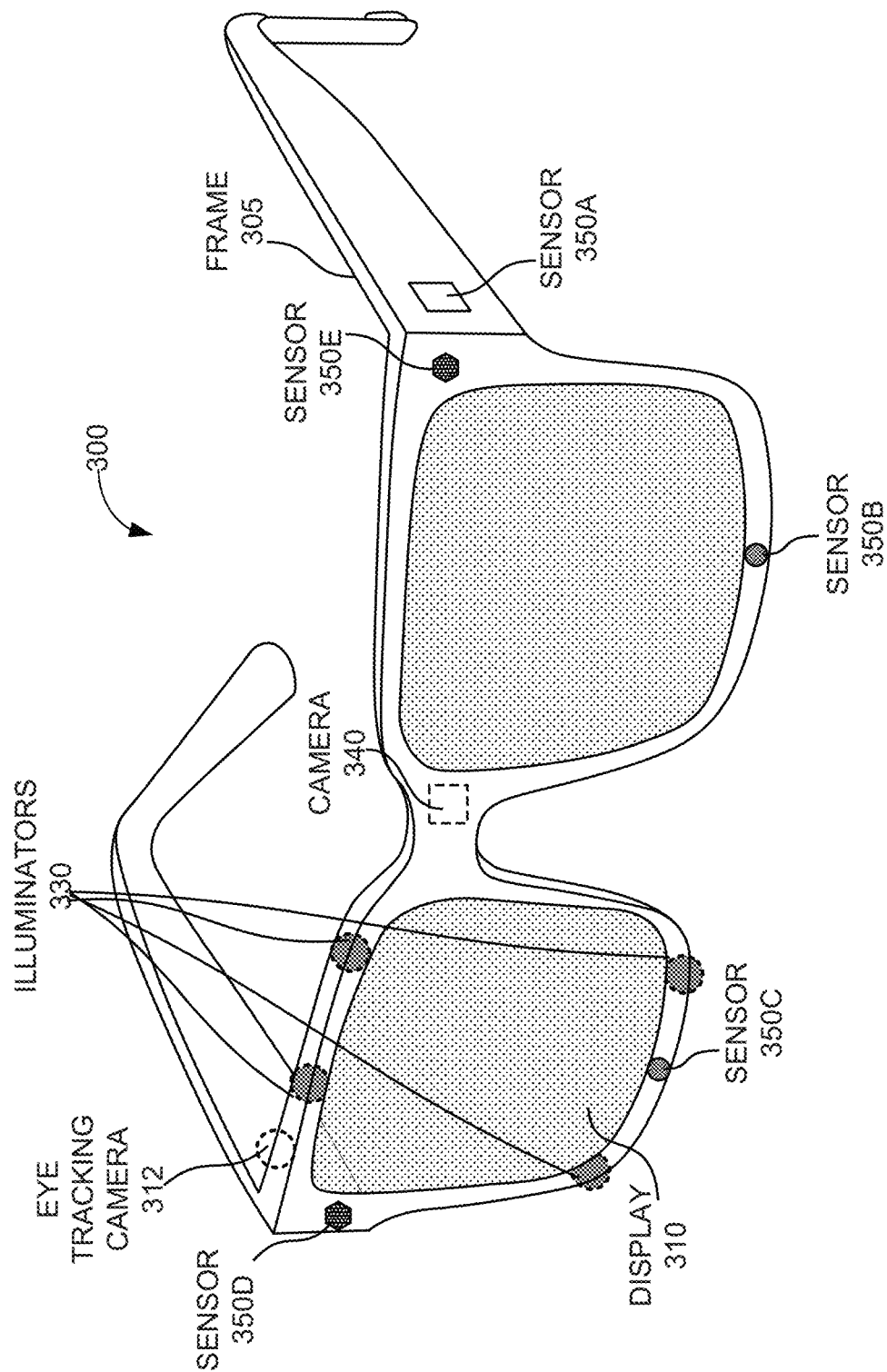
FIGS. 3A and 3B illustrate a perspective view and a top view of a near-eye display in the form of a pair of glasses, according to an example.

FIG. 3A is a perspective view of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display 300 may include a projector.

In some examples, the near-eye display 300 may further include various sensors 350a, 350b, 350c, 350d, and 350e on or within a frame 305. In some examples, the various sensors 350a-350e may include any number of depth sensors, motion sensors, position sensors, inertial sensors, and/or ambient light sensors, as shown. In some examples, the various sensors 350a-350e may include any number of image sensors configured to generate image data representing different fields of views in one or more different directions. In some examples, the various sensors 350a-350e may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors 350a-350e may also be used for stereoscopic imaging or other similar application.

In some examples, the near-eye display 300 may further include one or more illuminators 330 to project light to the eye. The projected light may be associated with different frequency bands (e.g., visible light, infra-red light, near-infrared light, etc.), and may serve various purposes. In some examples, light from the one or more illuminator(s) 330 may be used to generate glints on a surface of the eye, which may then be used in determining the eye's position (gaze) and other three-dimensional characteristics.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display 300 may also include an eye tracking camera 312.

Figure 3B:
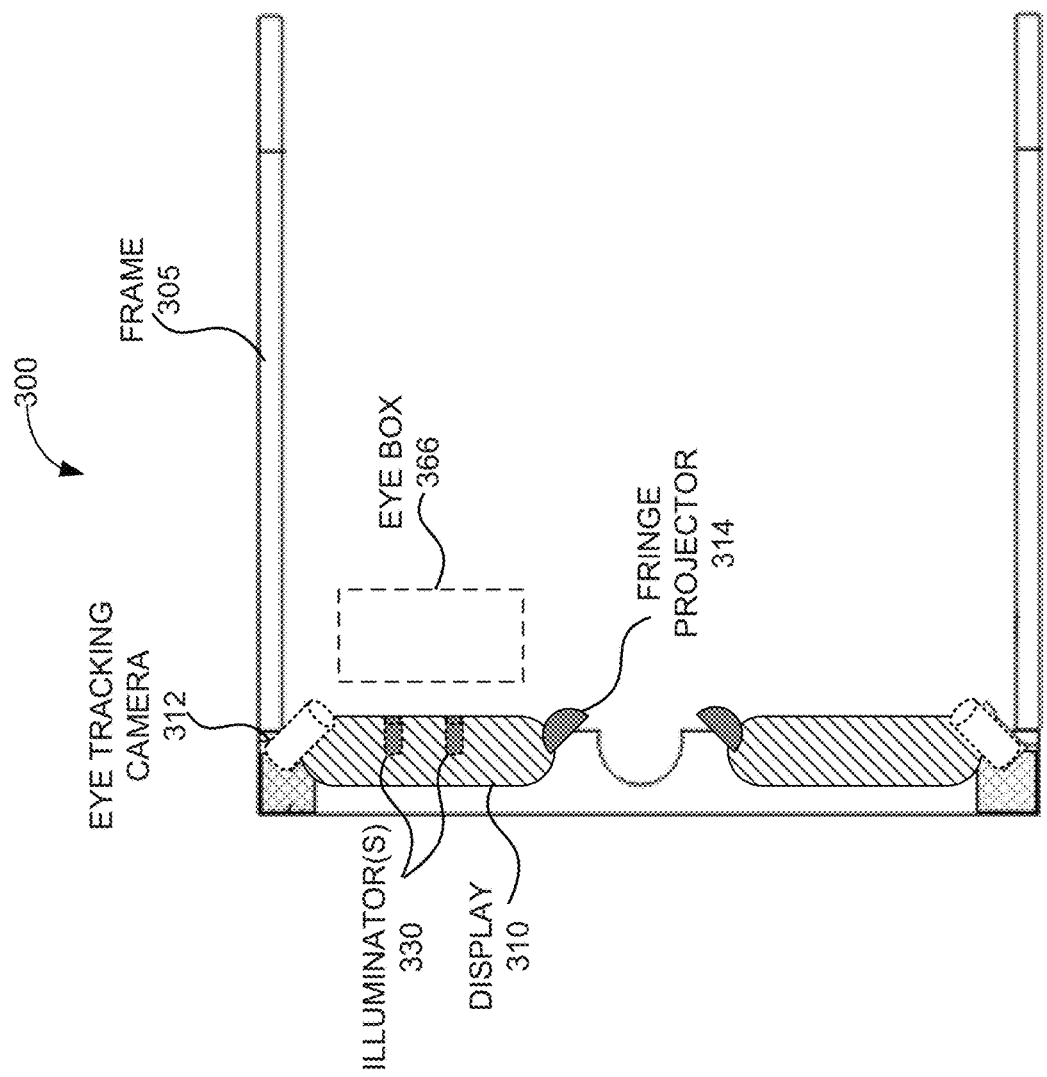

FIG. 3B is a top view of a near-eye display 300 in the form of a pair of glasses (or other similar eyewear), according to an example. In some examples, the near-eye display 300 may include a frame 305 having a form factor of a pair of eyeglasses. The frame 305 supports, for each eye: a fringe projector 314 such as any fringe projector variant considered herein, a display 310 to present content to an eye box 366, an eye tracking camera 312, and one or more illuminators 330. The illuminators 330 may be used for illuminating an eye box 366, as well as, for providing glint illumination to the eye. The fringe projector 314 may provide a periodic fringe pattern onto a user's eye. The display 310 may include a pupil-replicating waveguide to receive the fan of light beams and provide multiple laterally offset parallel copies of each beam of the fan of light beams, thereby extending a projected image over the eye box 366.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

The eye tracking camera 312 may be used to determine position and/or orientation of both eyes of the user. Once the position and orientation of the user's eyes are known, a gaze convergence distance and direction may be determined. The imagery displayed by the display 310 may be adjusted dynamically to account for the user's gaze, for a better fidelity of immersion of the user into the displayed augmented reality scenery, and/or to provide specific functions of interaction with the augmented reality. In operation, the illuminators 330 may illuminate the eyes at the corresponding eye boxes 366, to enable the eye tracking cameras to obtain the images of the eyes, as well as to provide reference reflections. The reflections (also referred to as "glints") may function as reference points in the captured eye image, facilitating the eye gazing direction determination by determining position of the eye pupil images relative to the glints. To avoid distracting the user with illuminating light, the latter may be made invisible to the user. For example, infrared light may be used to illuminate the eye boxes 366.

In some examples, the image processing and eye position/orientation determination functions may be performed by a central controller, not shown, of the near-eye display 300. The central controller may also provide control signals to the display 310 to generate the images to be displayed to the user, depending on the determined eye positions, eye orientations, gaze directions, eyes vergence, etc.

Figure 4:
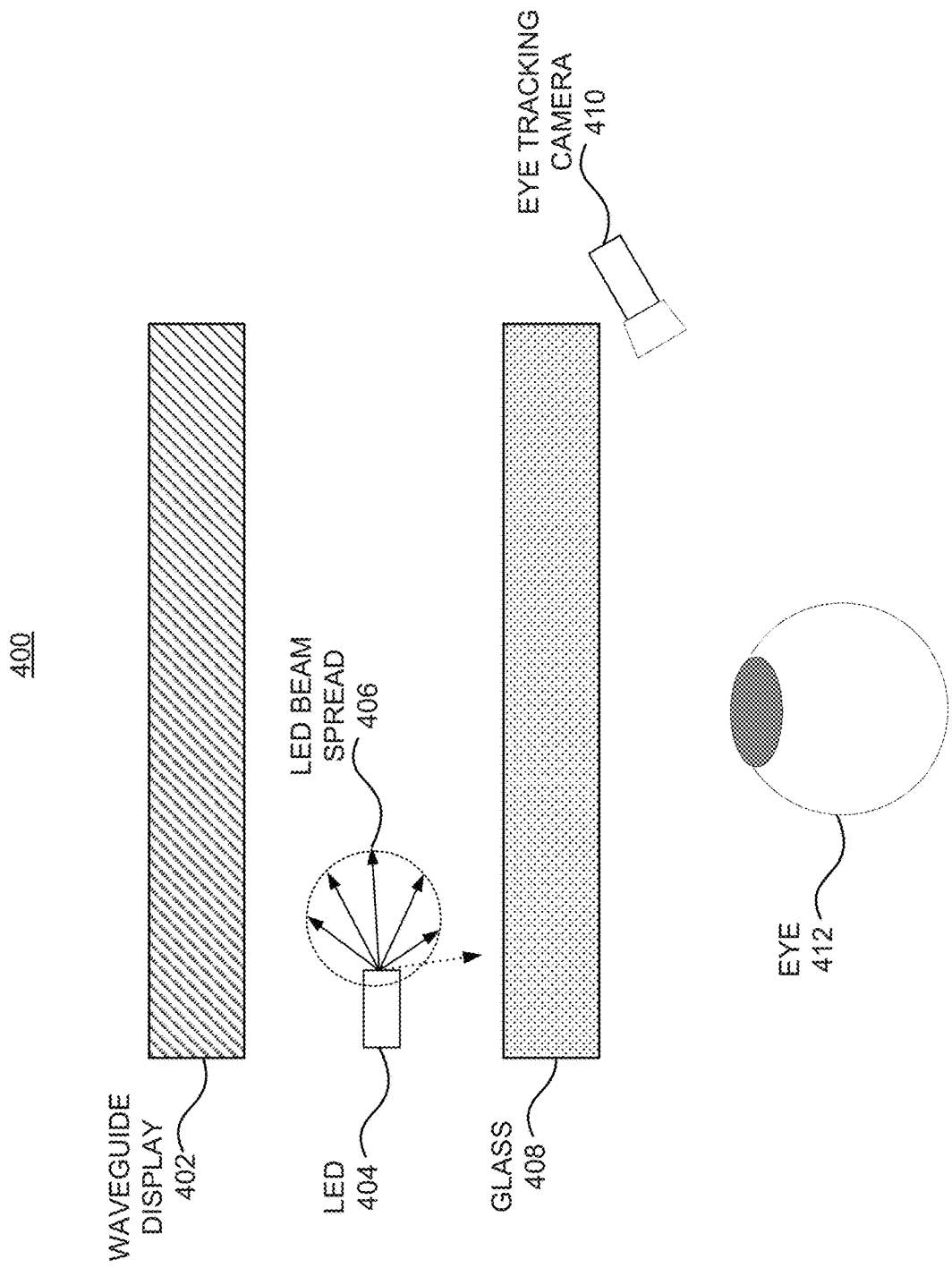
FIG. 4 illustrates a simplified lens perimeter illumination eye tracking system, according to an example.

FIG. 4 illustrates a simplified lens perimeter illumination eye tracking system, according to an example. Diagram 400 shows a waveguide display 402, a light emitting diode (LED) 404 with an LED beam spread 406, a glass 408, an eye tracking camera 410, and an eye 412. As mentioned herein, eye tracking obtains data about a user's eye(s) such as detecting presence, attention, focus, a position of a person's pupil, and pupil size. Data points such as pupil position, gaze vector of the eye, gaze point, and eye openness may be computed from the captured eye tracking information. With the gathered data, images may be projected into the user's eye more accurately and user's intent may be detected (as input to an interactive display system, for example).

Accordingly, light beams from the light emitting diode (LED) 404 that pass through the glass 408 and reach the eye 412 may be used as eye tracking illumination source with the eye tracking camera 410 detecting glints on a surface of the eye generated by the light beams. The detected glints may be used by three-dimensional detection algorithms, phase mapping algorithms, or similar ones to determine three-dimensional topography of the eye in a non-contact manner, with high resolution, and fast data processing.

In some examples, the waveguide display 402 may project artificial reality content (i.e., computer-generated content) to the eye 412. The waveguide display 402 may be a transparent display and allow light from the environment to pass through. Thus, artificial reality content may be superimposed with real content from the environment. In some cases, a number of optical elements such as lenses, polarizers, filters, waveguide plates, and comparable ones may be positioned between the waveguide display 402 and the glass 408 forming an optical assembly.

As mentioned herein, glints generated by illuminator(s) are needed to extract eye gaze and position. An in-field light emitting diode (LED) illumination system may provide sufficient illumination. However, in-field systems are expensive, complicated to integrate, and may not be able to mitigate challenges presented by a corrective lens, as discussed below. On the other hand, around-the-lens or frame light emitting diode (LED) systems may allow illumination light from the light emitting diodes (LEDs) may bypass any optical elements in the optical assembly (between the waveguide display 402 and the glass 408) allowing efficient illumination of the eye and mitigation of potential challenges due to the optical elements (e.g., reflection or diffraction of light, ghost signals, etc.).

In some examples, light sources other than light emitting diodes may also be used as illuminators. For example, side-emitting laser diodes, vertical-cavity surface-emitting laser diodes, or superluminescent light-emitting diodes are some non-limiting examples of light sources that may be used.

In some examples, multiple light emitting diodes (LEDs) may be placed on a flexible printed circuit board (PCB) affixed along a perimeter of the frame (containing the waveguide display 402). To provide illumination to the eye 412, the light emitting diodes (LEDs) may be positioned in a tilted manner (e.g., in virtual reality (VR) applications). However, this technique may increase a needed space in the optical assembly making the optical assembly thicker. To achieve a thinner optical assembly for lighter near-eye display devices (e.g., artificial reality (AR) glasses), the light emitting diodes (LEDs) may be placed horizontally (e.g., beam spread aligned with a plane of the optical assembly), where light beams from the light emitting diode (LED) 404 still pass through the glass 408 and illuminate the eye 412 and provide eye tracking functionality.

In some examples, one illuminator (light emitting diode (LED) 404) may be sufficient to provide the anchor glint. Yet, any number of illuminators may also be used. For example, up to 8 to 10 light emitting diodes (LEDs) may be used in some practical implementations. In some implementations, the illuminators may be infrared or near-infrared (NIR) to avoid distraction of the user. Thus, a number and/or a position of the illuminators may be selected based on a number of design considerations. The illuminators may be positioned such that the glints are generated within a field of view (FOV) of the eye tracking camera 410.

Figure 5A:
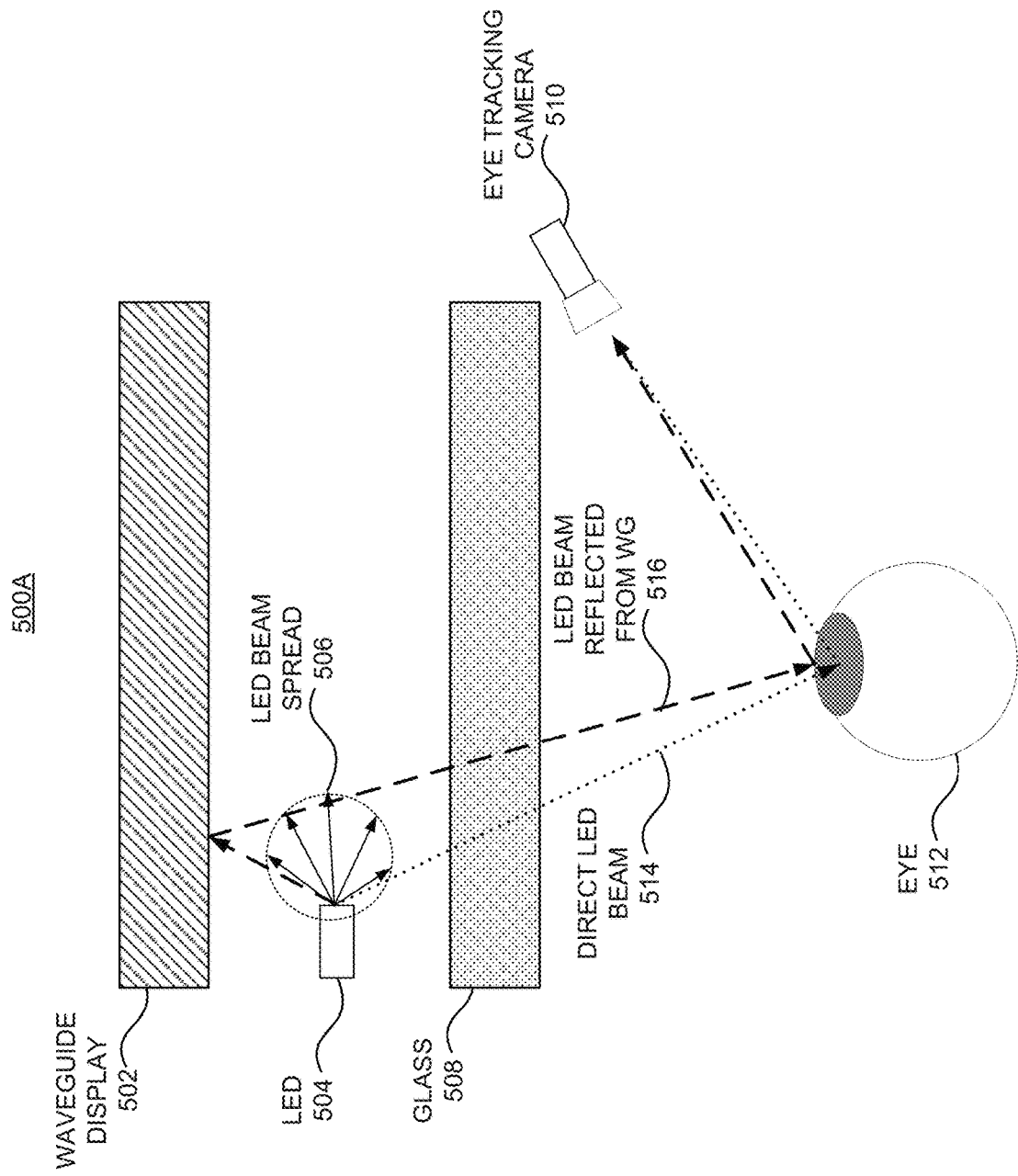
FIG. 5A illustrates waveguide display reflection in a lens perimeter illumination eye tracking system, which may result in double glints, according to an example.

FIG. 5A illustrates waveguide display reflection in a lens perimeter illumination eye tracking system, which may result in double glints, according to an example. Diagram 500A shows a waveguide display 502 presenting artificial reality content to an eye 512 through a glass 508 and/or other optical components (not shown). The waveguide display 502 may be transparent or semi-transparent and let light from the environment pass through for the eye 512 to see real environment images. Diagram 500A also shows light emitting diode (LED) 504 with an LED beam spread 506, which includes light beams (e.g., direct LED beam 514) to pass through the glass 508 and reach the eye 512. Reflection of the direct LED beam 514 may then be captured by the eye tracking camera 510 and used in three-dimensional detection of eye surface features to determine gaze and position. In some implementations, some light beams from the light emitting diode (LED) 504 may arrive at the waveguide display 502 and be reflected toward the eye 502 as LED beam 516 reflected from the waveguide display. A reflection of this secondary light beam may also be captured by the eye tracking camera 510 and result in double glints causing ghost signals and/or other mismatches in glint analysis. Furthermore, a portion of the light (e.g., more than half) may be wasted (i.e., not used for illumination of the eye 512).

Figure 5B:
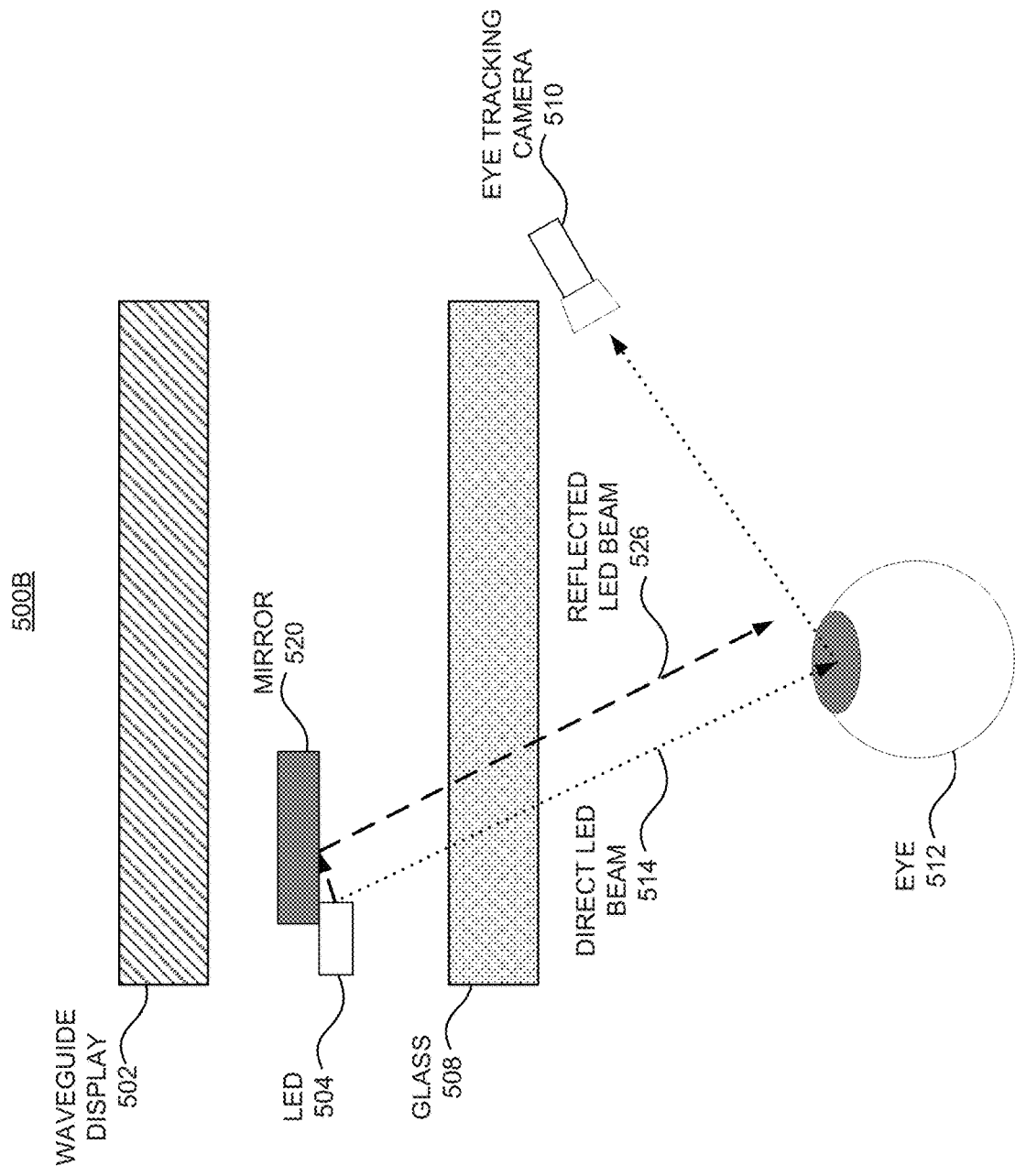
FIG. 5B illustrates mitigation of waveguide display reflection in a lens perimeter illumination eye tracking system, according to an example.

FIG. 5B illustrates mitigation of waveguide display reflection in a lens perimeter illumination eye tracking system, according to an example. Diagram 500B shows the same configuration of the eye tracking system as in FIG. 5A with the addition of a mirror 520 to mitigate the double glint challenge described above.

In some examples, the mirror 520 or a similar reflective element may be placed by the light emitting diode (LED) 504 between the light emitting diode (LED) 504 and the waveguide display 502. The mirror 520 may reflect light beams from the light emitting diode (LED) 504 toward the waveguide display 502. The reflected light beam 526 from the mirror may bypass the pupil or the eye 512 completely, and thus not be reflected from the eye to the eye tracking camera 510 avoiding double glints. In some examples, the mirror 520 may be shaped and/or positioned to control a direction of the reflected light beam 526 to bypass the pupil or the eye 512. Thus, in addition to mitigating the double glint challenge, the mirror 520 may also increase an illumination efficiency of the eye tracking system.

FIG. 6A illustrates beam dissipation caused by a corrective lens in a lens perimeter illumination eye tracking system, according to an example. Diagram 600A shows a waveguide display 602 and light emitting diode (LED) 604 providing eye tracking illumination to an eye 612 through a glass 608. Glints caused by the illumination may be captured by an eye tracking camera 610 and used to determine the gaze of the eye 612. In the illustrated configuration a corrective optical lens 614 may be attached to or integrated with the glass 608.

The corrective optical lens 614 may be used to assist users with eye deformities such as myopia, astigmatism, etc. However, the corrective optical lens 614 may also cause light beams from the light emitting diode (LED) 604 to be directed away from their original orientation. Thus, the illumination of the eye may be weakened and/or distorted by the presence of the corrective optical lens 614.

FIG. 6B illustrates prism representation of the corrective lens in a lens perimeter illumination eye tracking system, according to an example. Diagram 600B shows a prism 624, which represents an optical functionality of the corrective optical lens 614 with regard to light beams from the light emitting diode (LED) 604 such as LED beam 626. The LED beam 626 is refracted as it passes through the prism 626 (i.e., corrective optical lens 614) and may be deflected away from the eye box 622 meaning it may not illuminate the eye 612. Thus, the corrective optical lens 614 may reduce the illumination efficiency of the eye tracking system and potentially cause other distortion problems due to modification of light paths from the light emitting diode (LED) 604.

FIG. 6C illustrates representative irradiance maps for a lens perimeter illumination eye tracking system showing loss of illumination due to the corrective lens, which may result in double glints, according to an example. Diagram 600C shows an irradiance map 630 for an eye tracking system with around-the-lens light emitting diodes (LEDs) including substantially uniform illumination 634 of the eye box 632, where the illumination scale 636 indicates illumination levels.

Irradiance map 640 for the same eye tracking system with the addition of a high prescription corrective optical lens (e.g., −6 diopter) shows darker regions within the eye box 642 indicating lack of illumination caused by the corrective optical lens. The illumination scale 646 provides the color scale for the irradiance map. Thus, as shown by the irradiance maps, corrective optical lenses may substantially degrade a performance of an eye tracking system with side-emitting illumination LEDs.

In some examples, horizontal light emission by side- or top-emitting light emitting diodes (LEDs) may provide sufficient illumination for glint detection without the complexities of an in-field system. For example, if there is no corrective optical lens or a low prescription corrective optical lens, side emission (horizontal) may be sufficient. In case of higher prescription corrective optical lenses, the beam spread of the light emitting diodes (LEDs) may be angled to bypass or pass through edges of the corrective optical lens. Some examples implementations of light emitting diodes (LEDs) to provide the illumination are discussed below.

Figure 7:
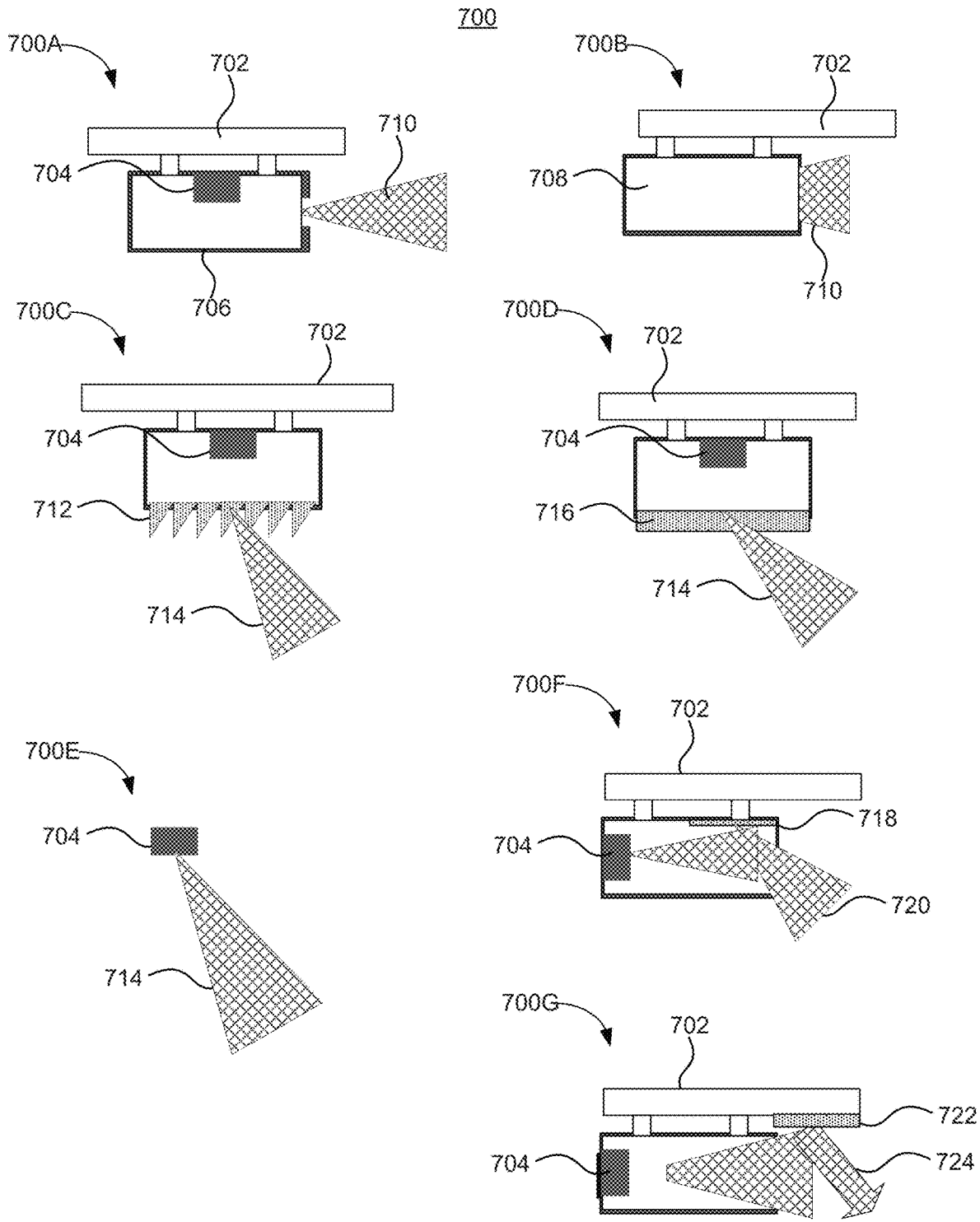
FIG. 7 illustrates various implementations of side- or top-emitting light emitting diodes (LEDs) for beam shaping in a lens perimeter illumination eye tracking system, according to an example.

FIG. 7 illustrates various implementations of side- or top-emitting light emitting diodes (LEDs) for beam shaping in a lens perimeter illumination eye tracking system, according to an example. Diagram 700 shows a side-emitting LED 700A with a molded label, a side-emitting LED 700B with a lead frame, a top emitting LED 700C with refractive layer, a top-emitting LED 700D with a diffractive layer, a custom design LED chip 700E with angled output, a side-emitting LED 700F with in-package reflector, and a side-emitting LED 700G with external reflector.

In some examples, the side-emitting LED 700A may be affixed to the frame containing the waveguide display and other optical components through a printed circuit board (PCB) 702. The LED package may include an LED chip 704 and a label 706 may be molded around the LED package to allow the side-emitting beam 710. The side-emitting LED 700B may include an LED package 708 with lead frame and provide side-emitting beam 710.

The top-emitting LED 700C may include a refractive layer 712, which enables the angled beam 714. The refractive layer 714 may be a bismuth silicate (BSO) layer, for example, and formed in any suitable shape. The top-emitting LED 700D may include a diffractive layer 716, which enables the angled beam 714. The diffractive layer 716 may also be a bismuth silicate (BSO) layer or another material. Furthermore, a micro-lens array, or micro-prism array may be used as refractive layer. Alternatively holographic gratings, meta-surfaces or patterned microstructure surfaces may be used as diffractive layer. In some examples, the custom design LED chip 700E may be designed at chip level to provide the angled beam 714 instead of package level or external modifications.

In some examples, the side-emitting LED 700F may be arranged with a reflector 718 inside the LED package to provide angled beam 720. Alternatively, side-emitting LED 700G may provide angled beam 720 through an external reflector 722 on the printed circuit board (PCB) 702.

Figure 8A:
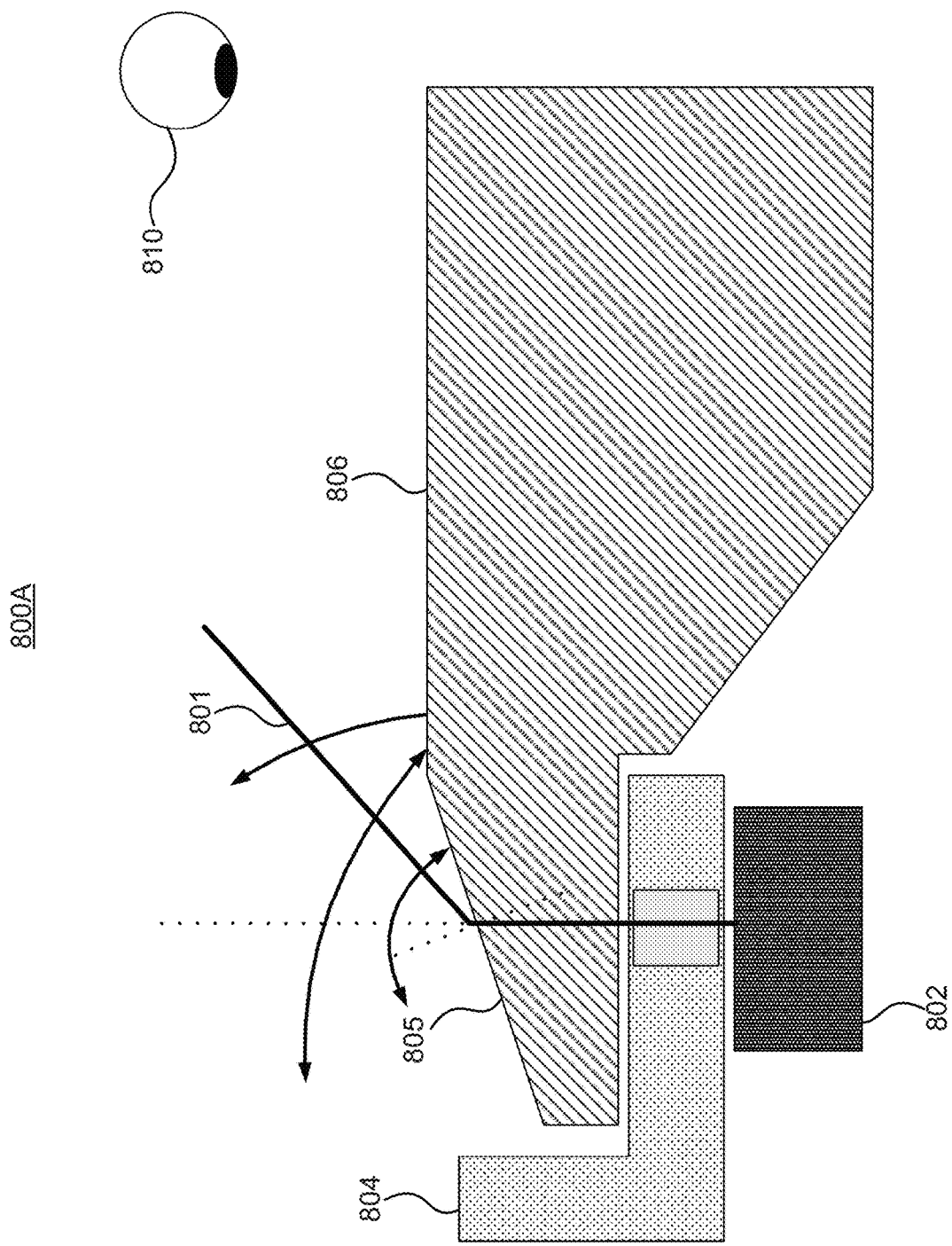
Figure 8B:
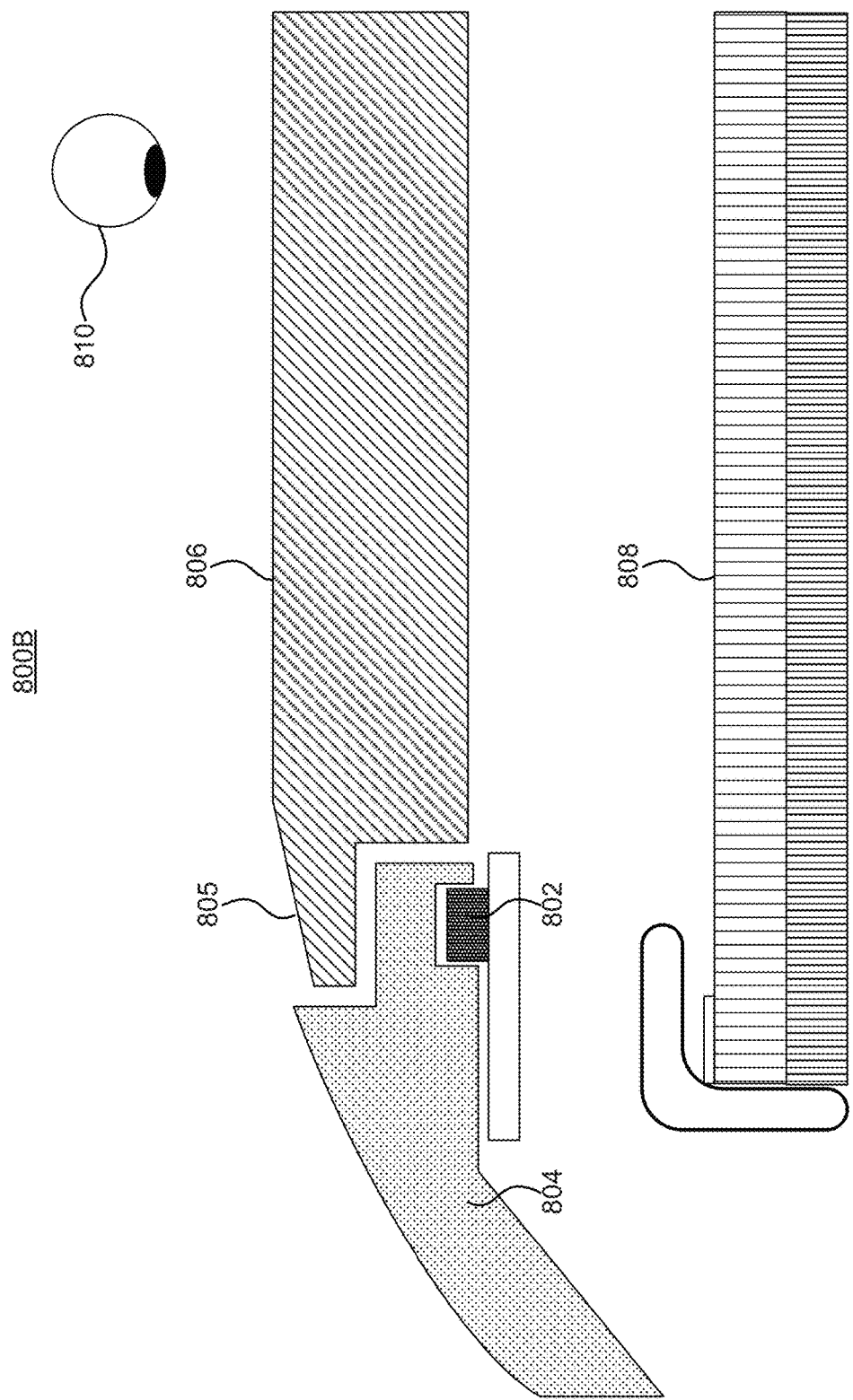
Figure 8C:
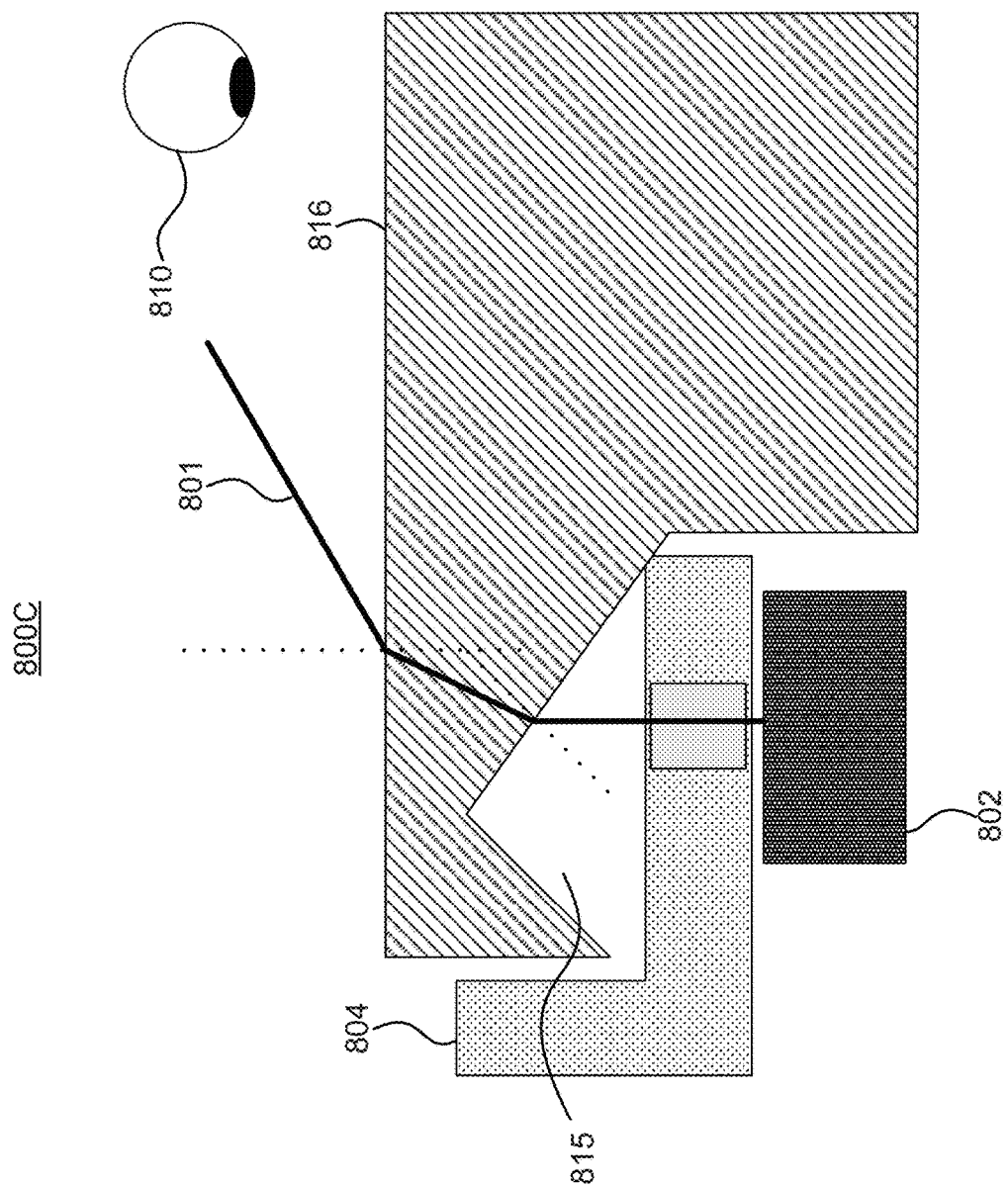
Figure 8D:
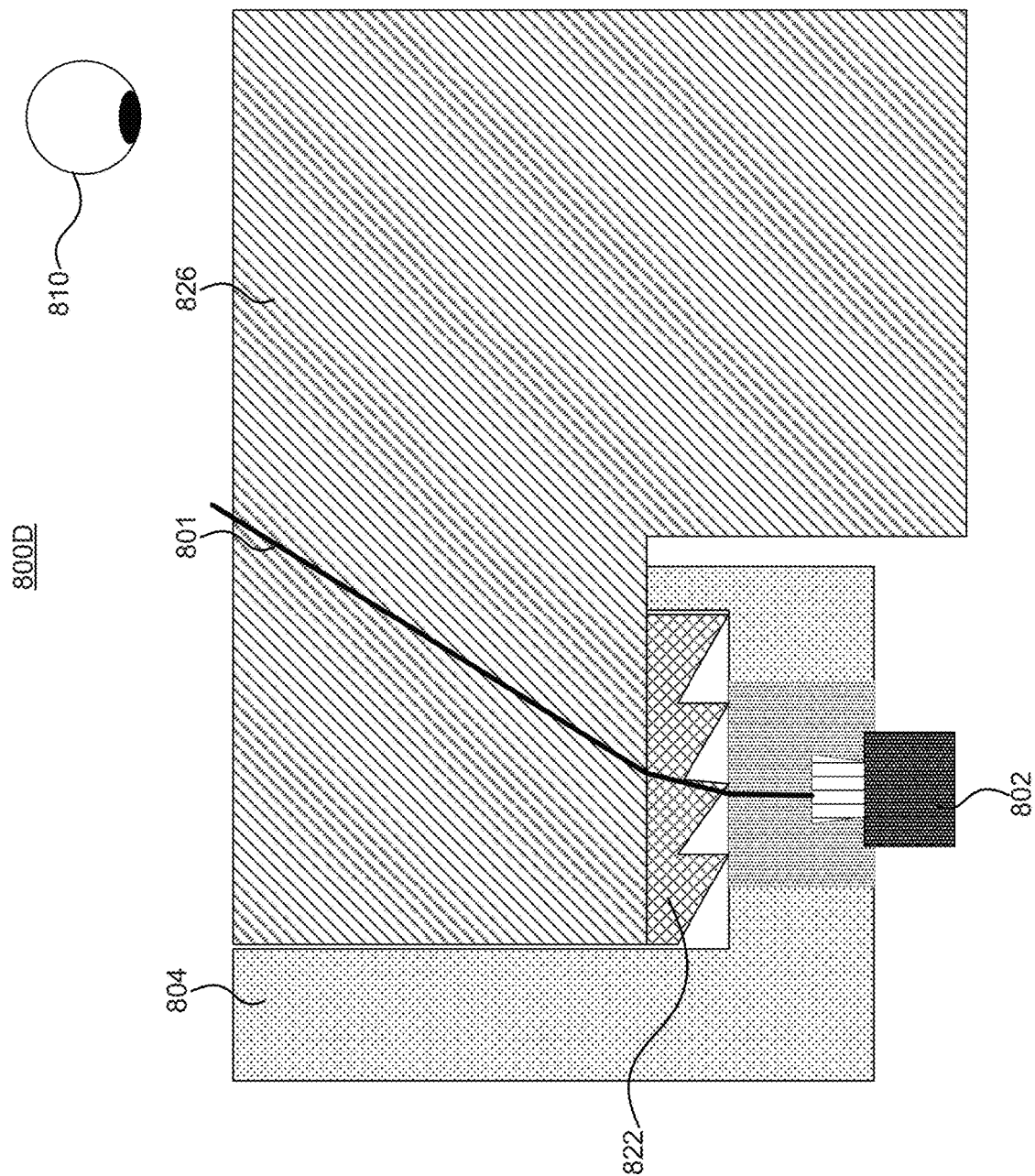

FIGS. 8A-8E illustrate various implementations of mitigating corrective optical lens distortions on light emitting diode (LED) beam in an eye tracking system, according to examples. Diagram 800A in FIG. 8A shows an illumination light emitting diode (LED) 802 attached to a frame 804, which also provides mechanical support for corrective optical lens 806 (among other optical assembly elements). The corrective optical lens 806 may have a user-specific prescription and be used to correct images provided to the eye 810.

In some examples, an edge portion of the corrective optical lens 806 covering the light emitting diode (LED) 802 may be shaped (e.g., surface away from the LED cut 805) to direct a light beam 801 from the light emitting diode (LED) 802 toward the eye 810 mitigating any distortions in the beam path that may be caused by the corrective optical lens 806. The shaping (e.g., cut 805 angle of the edge surface of the corrective optical lens) may be based on a prescription of the corrective optical lens 806. Diagram 800B is a slightly different illustration of the configuration of diagram 800A with the addition of the waveguide display 808 also included.

Diagram 800C shows another configuration with the edge of the corrective optical lens 816 cut in a different shape 818 at a surface proximal to the light emitting diode (LED) 802. The shape 818 of the edge cut may also the light beam from the light emitting diode (LED) 802 to pass through air first, then through the corrective optical lens before passing through air again toward the eye 810. Thus, the edge portion of the corrective optical lens 816 may be shaped (or cut) on either surface to achieve the same result.

Diagram 800D shows yet another configuration, where the edge portion of the corrective optical lens 826 is not cut or shaped specially to redirect light beams from the light emitting diode (LED) 802. However, a direction turning film or molded Fresnel structure 822 may be placed between the light emitting diode (LED) 802 and the corrective optical lens 826 to redirect the light beam 801 toward the eye 810. Diagram 800E is a slightly different view of the same configuration as in Diagram 800D with the waveguide display 808 included. Diagram 800E further shows the beam redirecting portion may not necessarily be a separate component (or material), but a refractive shaped portion 824 of the corrective optical lens 826.

According to examples, a method of making an eye tracking system with around-the-lens light emitting diodes (LEDs) is described herein. A system of making the eye tracking system with around-the-lens light emitting diodes (LEDs) is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. An eye tracking system, comprising:
   a plurality of illuminators to generate glints on a surface of an eye, wherein
      the plurality of illuminators is positioned along a frame that contains an optical assembly for a near-eye display device, and
      an illumination of the plurality of illuminators is aligned with a plane of the optical assembly;
   an eye tracking camera to capture an image of the eye with the glints; and
   a processor communicatively coupled to the plurality of illuminators and the eye tracking camera, the processor to determine three-dimensional features of the surface of the eye based on the captured image of the eye with the glints to determine a position and a gaze of the eye.

2. The eye tracking system of claim 1, wherein the plurality of illuminators comprises one or more of light emitting diodes (LEDs), side-emitting laser diodes, vertical-cavity surface-emitting laser diodes, or superluminescent light-emitting diodes.

3. The eye tracking system of claim 2, wherein the LEDs emit visible, infrared, or near-infrared light.

4. The eye tracking system of claim 2, wherein the LEDs comprise side-emitting label-wrapped LEDs or lead frame LEDs.

5. The eye tracking system of claim 2, wherein the LEDs comprise angled-emission LEDs that include a refractive layer or a diffractive layer to achieve the angled-emission.

6. The eye tracking system of claim 2, wherein the LEDs comprise angled-emission LEDs that include an in-package reflector or an external reflector to achieve the angled-emission.

7. The eye tracking system of claim 1, wherein the plurality of illuminators are positioned such that the glints are within a field of view (FOV) of the eye tracking camera.

8. The eye tracking system of claim 1, wherein the optical assembly comprises a corrective optical lens, and an edge portion of the corrective optical lens is shaped to direct the illumination of the plurality of illuminators toward the eye.

9. The eye tracking system of claim 1, wherein the plurality of illuminators comprise up to 20 illuminators.

10. A near-eye display device, comprising:
    an optical assembly comprising a waveguide display to project artificial reality content to an eye;
    an eye tracking system, comprising:
       a plurality of illuminators to generate glints on a surface of the eye, wherein
          the plurality of illuminators is positioned along a frame that contains the optical assembly, and
          an illumination of the plurality of illuminators is aligned with a plane of the optical assembly;
       an eye tracking camera to capture the glints on the surface of the eye; and
       a processor communicatively coupled to the plurality of illuminators and the eye tracking camera, the processor to determine three-dimensional features of the surface of the eye based on the captured glints to determine a position and a gaze of the eye.

11. The near-eye display device of claim 10, wherein the plurality of illuminators comprise light emitting diodes (LEDs) that emit visible, infrared, or near-infrared light.

12. The near-eye display device of claim 11, wherein the LEDs comprise:
    side-emitting label-wrapped LEDs or lead frame LEDs.

13. The near-eye display device of claim 11, wherein the LEDs comprise:
    angled-emission LEDs that include a refractive layer or a diffractive layer to achieve the angled-emission, or
    angled-emission LEDs that include an in-package reflector or an external reflector to achieve the angled-emission.

14. The near-eye display device of claim 10, wherein the plurality of illuminators are positioned such that the glints are within a field of view (FOV) of the eye tracking camera.

15. The near-eye display device of claim 10, wherein the optical assembly comprises a corrective optical lens, and an edge portion of the corrective optical lens is shaped to direct the illumination of the plurality of illuminators toward the eye.

16. The near-eye display device of claim 10, wherein the optical assembly comprises a corrective optical lens, and an edge portion of the corrective optical lens is complemented with a refractive element to direct the illumination of the plurality of illuminators toward the eye.

17. A method, comprising:
    illuminating an eye by a plurality of illuminators positioned along a frame that contains an optical assembly for a near-eye display device, wherein an illumination of the plurality of illuminators is aligned with a plane of the optical assembly;
    capturing an image of the eye with glints generated by the illumination through an eye tracking camera;
    determining three-dimensional features of a surface of the eye based on the captured image of the eye with the glints by a processor communicatively coupled to the plurality of illuminators and the eye tracking camera; and
    determining a position and a gaze of the eye based on the determined three-dimensional features.

18. The method of claim 17, wherein illuminating the eye by the plurality of illuminators comprises:
    directing light to the surface of the eye through a refractive layer or a diffractive layer of an angled-emission light emitting diode (LED).

19. The method of claim 17, wherein illuminating the eye by the plurality of illuminators comprises:
    directing light to the surface of the eye through an in-package reflector or an external reflector of an angled-emission light emitting diode (LED).

20. The method of claim 17, further comprising:
    positioning the plurality of illuminators such that the glints are within a field of view (FOV) of the eye tracking camera.

* * * * *